United States Patent
Brezak, Jr. et al.

(10) Patent No.: US 7,308,709 B1
(45) Date of Patent: Dec. 11, 2007

(54) SYSTEM AND METHOD FOR MANAGING AND AUTHENTICATING SERVICES VIA SERVICE PRINCIPAL NAMES

(75) Inventors: John E. Brezak, Jr., Woodinville, WA (US); Richard B. Ward, Redmond, WA (US); Paul J. Leach, Seattle, WA (US); Michael M. Swift, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,079

(22) Filed: Apr. 27, 2000

Related U.S. Application Data

(60) Provisional application No. 60/198,950, filed on Apr. 21, 2000.

(51) Int. Cl.
*G06F 17/00* (2006.01)
*H04L 9/00* (2006.01)

(52) U.S. Cl. .................. 726/10; 713/151; 713/153; 713/155

(58) Field of Classification Search ........ 713/151–156, 713/200–202, 189; 726/10, 2.5
See application file for complete search history.

(56) References Cited

U.S. PATENT DOCUMENTS

| 5,315,657 | A | * | 5/1994 | Abadi et al. ............... 713/156 |
| 5,349,643 | A | * | 9/1994 | Cox et al. .................. 713/155 |
| 5,491,752 | A | * | 2/1996 | Kaufman et al. ........... 713/155 |
| 5,832,211 | A | | 11/1998 | Blakley, III et al. .... 395/188.01 |
| 5,838,903 | A | | 11/1998 | Blakely, III et al. .... 395/188.01 |
| 5,862,323 | A | | 1/1999 | Blakley, III et al. .... 395/188.01 |

OTHER PUBLICATIONS

Schneier, Applied Cryptography, Second Edition: protocols, algortihms, and source code in C, 1996, John Wiley & Sons, pp. 566-571.*
Pinkert et al., Operating systems: concepts, policies, and mechanisms, 1989, Prentice Hall, pp. 205-207.*
http://web.mit.edu/Kerberos/, year 2007.*
http://tools.ietf.org/html/draft-ietf-krb-wg-kerberos-referrals-00, year 2000.*
http://tools.ietf.org/html/draft-ietf-krb-wg-kerberos-referrals-03, year 2003.*

* cited by examiner

*Primary Examiner*—David Jung
(74) *Attorney, Agent, or Firm*—Amin, Turocy & Calvin, LLP

(57) ABSTRACT

A methododology is provided for facilitating authentication of a service. The methodology includes making a request to a first party for authentication of a service, the request including a first alias. A list of aliases associated with the service is then searched enabling a second party making the request to access the service if a match is found between the first alias and at least one alias of the list of aliases.

24 Claims, 8 Drawing Sheets

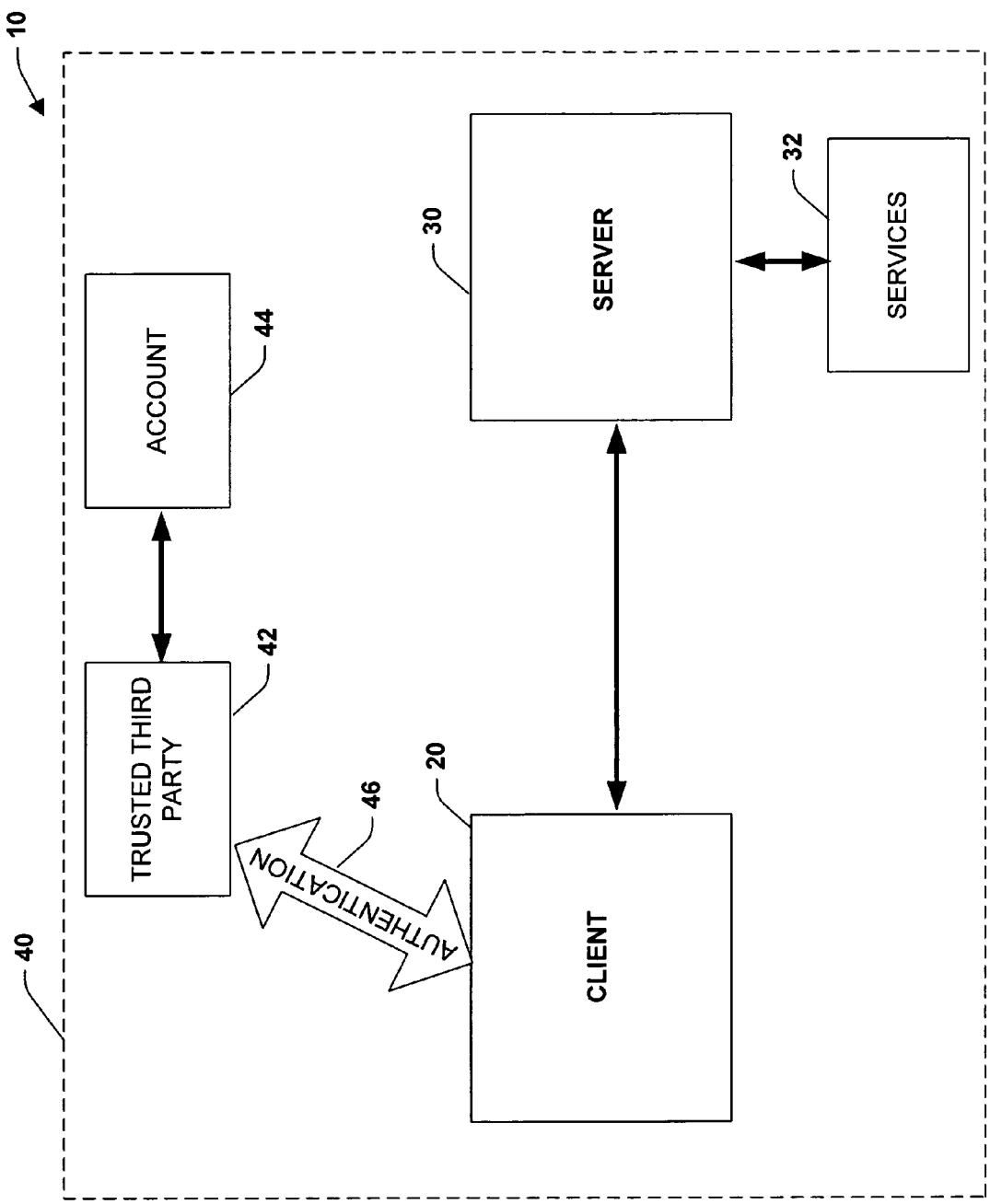

SYSTEM AND METHOD FOR MANAGING AND AUTHENTICATING SERVICES VIA SERVICE PRINCIPAL NAMES

CROSS-REFERENCE TO RELATED APPLICATION

This application claims the benefit of U.S. Provisional Application 60/198,950, entitled SYSTEM AND METHOD FOR MANAGING AND AUTHENTICATING SERVICES VIA SERVICE PRINCIPAL NAMES, filed on Apr. 21, 2000 under Express Mail No. EL550249655US.

TECHNICAL FIELD

The present invention relates generally to computer systems, and more particularly to a system and method for authenticating services between a client and a server by a trusted third party wherein service principal names are employed to reduce management overhead associated with conventional systems.

BACKGROUND OF THE INVENTION

Many computer systems requiring network communications employ a security infrastructure to ensure that parties such as clients and servers authenticate (e.g., securely identify) each other before one party will process a request from the other party. For example, Kerberos and/or SSL with Public Key Infrastructure (PKI) X.509 certificates may be employed to establish such relationships. With Kerberos, a client may request a ticket to authenticate with a server for a particular service such as a directory service. These services generally may be identified by a service principal name (SPN) in order to authenticate a desired transaction. As system complexities and server responsibilities have increased however, management burdens associated with the authentication process have increased dramatically. Historically, wherein systems may have had only a few names and services to manage and/or authenticate, modern systems may have hundreds of thousands of such names. Some current authentication implementations may construct service principal names from a known service name and a realm. A service principal name may be constructed for example from a name of the type of the service and a Domain Name Server (DNS) host name of a computer providing the service. For example, the printing service for the drafting group of the engineering department in the R&D division of the Example Corporation might be print/draft.eng.rd.example.com@example.com, wherein "print" is the type of the service, the server's name is "draft.eng.rd.example.com", and the realm name would be "example.com". Many systems require only a single realm wherein all users and services are part of the same realm. However, in a system wherein multiple trusted realms are required, a client system must first determine what realm a particular user or service is in before requesting a ticket. However, in many circumstances, the users may only know the name of the server, which may not be directly related to the realm name. For example, the printing service described above may be shared by all employees in building 16, regardless of division, so the server it runs on may be named "bldg16.example.com" and the realm may be managed by the MIS department, so it may be named "mis.example.com". Current authentication mechanisms unfortunately require clients and servers to maintain extensive mappings in order to determine the desired realm. These mechanisms require that each client have detailed configuration information regarding the hosts that are providing such services and corresponding realms. Client side configuration is therefore costly from an administration point of view—especially when there are many realms and computer systems in the environment.

Another problem associated with conventional authentication systems is that services may reside on hosts that may have multiple host names (e.g., multi-homed hosts). Conventionally, each host name would require a distinct name and corresponding key for authentication. As described above, management of potentially thousands of such names and keys is both burdensome and expensive. Still yet another problem associated with conventional authentication systems is that they may not deal securely with replicated services. A replicated service is one wherein many copies of the service run—each on a different server. Each copy may provide essentially the same service (e.g., the data on one service may be slightly out of date compared to another one, but not so much that clients may be affected substantially). Some of the reasons for multiple copies of services are related to robustness and performance. Robustness may be enhanced because if some copies fail, remaining copies may still provide service, although, with somewhat lower performance. Performance may be enhanced, because the number of copies may be increased to handle increased numbers of clients, while attaining similar levels of performance for each client.

In a conventional system (e.g., Kerberos authentication), a domain controller (referred to as a KDC in Kerberos terminology), may provide assurances, that to a client, a non-replicated service is authentic, even if a DNS has been compromised to give an incorrect network address for the host name of the server running a service. However, a replicated service is often located by employing a DNS to resolve the service name to a list of hosts running the service. If the DNS is compromised and caused to give back an incorrect list, yet the hosts in the list are running a different instance of the service, the KDC may not detect the error.

For example, a printing service for an Example Corporation may be named "prt.example.com" and thereby run on servers "p1.example.com" and "p2.example.com". Generally, a Kerberos client may resolve "prt.example.com" to "p1.example.com" and "p2.example.com", select a name (e.g., the first one), construct an SPN "print/p1.example.com", and utilize Kerberos to get a ticket which would authenticate itself to "p1.example.com" and vice-versa. If an unscrupulous employee of Example Corporation were to run a printing service for a small workgroup, however, and the service were to run on the server "pwkgrp.example.com", security problems are likely to arise. If the employee were to cause the DNS to return "pwkgrp.example.com" as the server running "prt.example.com", then the client may construct the SPN "print/pwkgrp.example.com", which Kerberos may then authenticate, and the client may unfortunately print confidential information on the unscrupulous employee's printer.

Currently, there is not an efficient and straightforward way of managing and authenticating system services without substantial configuration, associated administration costs and security concerns. Consequently, there is an unsolved need in the art for authenticating services by mitigating client/server configuration requirements.

SUMMARY OF THE INVENTION

The present invention relates to a system and method for managing and authenticating services between a client and server connected over a network. In accordance with the present invention, services offered by a server system may be authenticated by a trusted third party via an assigned alias. A client system, when requesting a service (e.g., print request) from the server may issue a request for authentication of the service to the trusted third party by employing a plurality of names for that service. Based on the request, the trusted third party may then search a list of Service Principle Names (SPN) (e.g., aliases) associated with the server and related services associated therewith. If a match is found according to the search, the client is then enabled by the trusted third party to access the service located at the server—regardless of the service name employed to request the service. In this manner, management burdens associated with conventional systems are mitigated.

For example, in a conventional system, a service request may include a name such as lpr/printserver. Another name for the same service may include lpr/printserver.co.com. Conventionally, a separate account and associated password would have to be maintained by the client and server for each service name. In large systems, this may include managing hundreds of thousands of such names and accounts. By employing SPNs, clients and servers are relieved of managing these names by enabling the trusted third party to authenticate the various service names.

More specifically, a client system provides a request to a trusted third party such as a domain controller. The domain controller maintains accounts that are related to servers that provide the requested services. The accounts may include a listing of Service Principal Names that may be associated with the client service requests. If the client's service request is found in the listing, a ticket related to the account may then be issued to the client to enable the client to receive the requested service from the server—this process may be referred to as name cannonicalization. If the SPN is not found in the listing, an error message may be returned to the client. In this manner, clients receive a ticket generally related to the server yet may request the services via a plurality of service request names. Thus, management of separate accounts and passwords associated with a plurality of client service names is mitigated.

Related to the authentication of services within a domain, a referral service may also be provided in accordance with the present invention. Referrals may be provided to a client when authenticating a particular service with the domain controller. When a client requests a particular service outside of a domain, a referral may be granted to the client directing the client to another domain providing the requested service. The referral may include a ticket to the next realm for the service and may include the SPN for the particular realm providing the service.

In accordance with another aspect of the present invention, an implicit list may be employed to facilitate registering the SPN's described above. The implicit list may be automatically created/derived to provide a grouping of routinely requested service names associated with a particular server. In this manner, routinely requested services such as HTTP, CIFS, and FTP, for example, may be placed into an account that is associated with a particular server thereby mitigating the need for an administrator to manually enter a list of SPNs. Moreover, when names are referred to in implicit form, future changes related to the list may occur in a global manner and thus mitigate the need to change individual service names.

In accordance with another aspect of the present invention, an improved security system is provided for replicated services. Security is improved by including the name of the replicated service within the SPN described above. In this manner, unscrupulous users may be prevented from diverting confidential client information. For example, an unscrupulous user could set up a computer in a domain and set the SPN to take over an unused SPN on another host, and thereby convince clients to connect to the host for services. Without namespace constraints in accordance with the present invention, the above scenario may be possible.

According to another aspect of the present invention, constraint checking may be employed to increase security aspects of the authentication process. Constraint checking may be related to verifying a predetermined set of attributes associated with a particular server's account. Attributes may include physical names for the server and associated logical names. By checking that logical names are related to the physical name of the server computer, "imposter" servers are prevented from providing the requested services. Thus, security is improved by preventing an unauthorized server from masquerading as an authorized service on another computer.

One aspect of the present invention relates to a method for facilitating authentication of a service. A request is made to a first party for authentication of the service, the request includes a first alias. A list of aliases associated with the service is searched. A second party making the request to access the service is enabled if a match is found between the first alias and at least one alias of the list of aliases.

Another aspect of the present invention relates to a domain controller for facilitating a client authenticating a server. The domain controller comprises a system for providing a plurality of aliases which the client may employ to authenticate to the server.

Yet another aspect of the present invention relates to a system for facilitating a client authenticating a server, comprising: a domain controller operatively coupled to the client and server, the domain controller providing a plurality of aliases which permit the client to authenticate the server via at least one of the aliases.

Still another aspect of the present invention relates to a system for facilitating authentication of a service, comprising: means for receiving a request for authentication of the service from a client, the request including a first alias; means for searching a list of aliases associated with the service; means for enabling the client to access the service if a match is found between the first alias and at least one alias of the list of aliases.

Another aspect of the present invention relates to a system for facilitating authentication of a service. A domain controller receives a request for authentication of the service from a client—the request includes a first alias. The domain controller searches a list of aliases in an account associated with the service. The domain controller enables the client to access the service via a ticket if a match is found in the account between the first alias and at least one alias of the list of aliases.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 1 is a schematic block diagram illustrating an authentication system in accordance with one aspect of the present invention;

DETAILED DESCRIPTION OF THE INVENTION

Figure 2A:
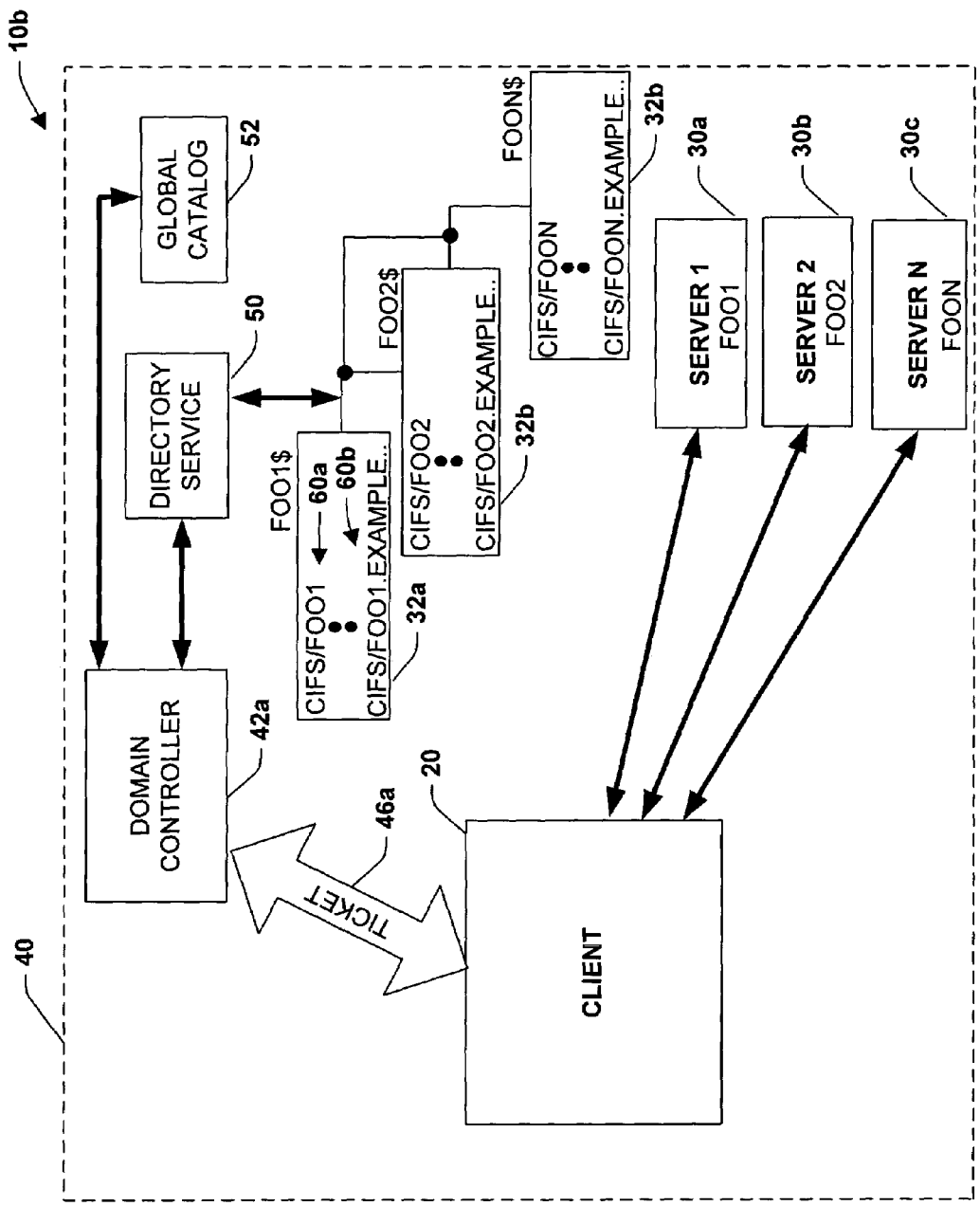
FIG. 2a is a schematic block diagram illustrating an authentication system employing name cannonicalization in accordance with one aspect of the present invention.

The present invention is now described with reference to the drawings, wherein like reference numerals are used to refer to like elements throughout.

In accordance with the present invention, a system and method is provided that employs name cannonicalization by a trusted $3^{rd}$ party to provide authentication between a client and a server. This mitigates configuration and management problems associated with conventional systems by simplifying administration of service names and minimizing configuration information required for each computer system. More specifically, a system and method is provided wherein a trusted third party is employed to handle cannonicalization of names, provide aliases for users and services and to enable the trusted third party to determine a trusted realm authentication path by generating referrals to other realms in order to locate associated principals for requested services. Furthermore, as will be described in more detail below, authentication security may be improved by employing constraint checking to prevent unauthorized services and by utilizing the names of replicated services within a Service Principal Name to prevent unwanted disclosure of confidential information.

Referring initially to FIG. 1a, a system 10 illustrates a particular aspect of the present invention related to authenticating services between a client 20 and a server 30. The server 30 may provide a plurality of services 32 which may be accessed by the client 20. The system 10 may be defined by a domain 40, which may alternatively be referred to as a realm, and may include a trusted third party 42. The trusted third party 42 may have an associated account 44 referring to Service Principal Names (SPN) in accordance with the present invention for providing authentication 46 between the client 20 and server 30. By utilizing SPNs, aliases may be established for the services 32 offered by the server 30. Since each SPN may act as an alias for an existing account 44, complexity related to account and key management is mitigated.

In contrast to conventional systems, wherein separate accounts and keys for each possible service 32 would be maintained at the client 20, and wherein separate computer names would be required in the case of replicated services, a single account 44 and associated key may be employed for all instances. Thus, by utilizing SPNs, clients 20 do not need to know the realm 40 for each service 32. Therefore, SPNs enable configuration to be shifted from potentially thousands of client computers to a relatively small number of accounts 44 resulting in a significant reduction in operating costs. Furthermore, as will be described in more detail below in relation to FIG. 2b, a referral to other realms may be provided by the trusted third party 42 to enable the client 20 to locate services that may be outside of the realm 40. Referrals provide an improved system for managing multiple realm environments and reduce management and overhead costs associated with conventional systems. It is to be appreciated that a plurality of servers also may be accessed by the client 20.

Referring now to FIG. 2a, a system 10b illustrates a particular aspect of the present invention relating to name cannocalization for authenticating a trust relationship between a client 20 and a plurality of servers 30a through 30c. The servers may be referred to as server 1, server 2 and server N with N representing an integer. A Domain Controller (DC) 42a may be provided as a trusted third party to establish the trust relationship between the client 20 and servers 30a-30c. Included with the DC 42a may be a Directory Service (DS) 50 for providing a directory of accounts within the domain 40 and a Global Catalog Service (GCS) 52 for providing information in regard to additional domains (not shown) within a given enterprise. In accordance with the present invention, an account 32a-32c may be maintained by the DC 50 for each server 30a through 30c within the domain 40. For example, for the first server 30a, which may be referred to by a generic server name of FOO1$, an associated account 32a may be provided on the DC 50 having an associated name of FOO1$. Likewise, the second server 30b, which may be referred by a generic server name of FOO2, has an associated account 32b that may be referred to as FOO2$. As illustrated, FOON$ for account 32c may also be associated with an Nth server 32c.

Within each account 32a-32c, a listing of aliases may be maintained for various services offered by the associated server. These lists may also contain different names that may be employed by the client 20 to refer to the same service. The names relating to the aliases may be referred to as Service Principal Names (SPN). For example, under the account 32a FOO1$, an exemplary SPN name may refer to the service provided by FOO1 as CIFS/FOO1 60a. Another SPN listing may refer to CIFS/FOO1.example.com 60b. By utilizing SPNs, the client 20 does not have to maintain a separate name and associated password relating to the plurality of associated names that may be referred to on a given server. It is to be appreciated that a plurality of SPNs may be employed with associated longer and/or shorter name extensions (e.g., www/srv1.example.com/www.example.com) as will be described in more detail below.

In order to authenticate a service, the client 20 may request a ticket 46a (e.g., Kerberos) from the DC 42a. The DC 42a may then search for an account 32a-32c related to the particular server providing the requested service. For example, the client 20 may request the service CIFS/FOO1. The DC would then go to the FOO1$ account and search the listed aliases for the associated SPN CIFS/FOO1 60a. If a match were found, the DC 42a may then return a ticket 46a relating to the associated name of the account FOO1$. This process is referred to as name cannonicalization, wherein a client requests one form of a named service and receives back an authenticated ticket related to an account associated with a plurality of services offered by a particular server. In this manner, clients may request name authentication via a plurality of forms and receive a single form of authenticated ticket in return. Since in practice each unique account may require a distinct password, name cannonicalization significantly reduces management and configuration associated with conventional systems wherein every client would be required to maintain separate accounts, names, and passwords for each associated service name.

By providing a singular password representing an account of a plurality of services, separate passwords for each service as associated with conventional systems, may be eliminated. Thus, management and authentication of services are substantially improved over conventional systems. For example, in large systems wherein many clients access many services from a plurality of servers, each client would conventionally have to be configured for the particular services and names. By maintaining a single account at the DC 42a, such problems are mitigated. It is noted that if a name is not found during the above described search, that an error message (not shown) may be returned to the client 20.

Figure 2B:
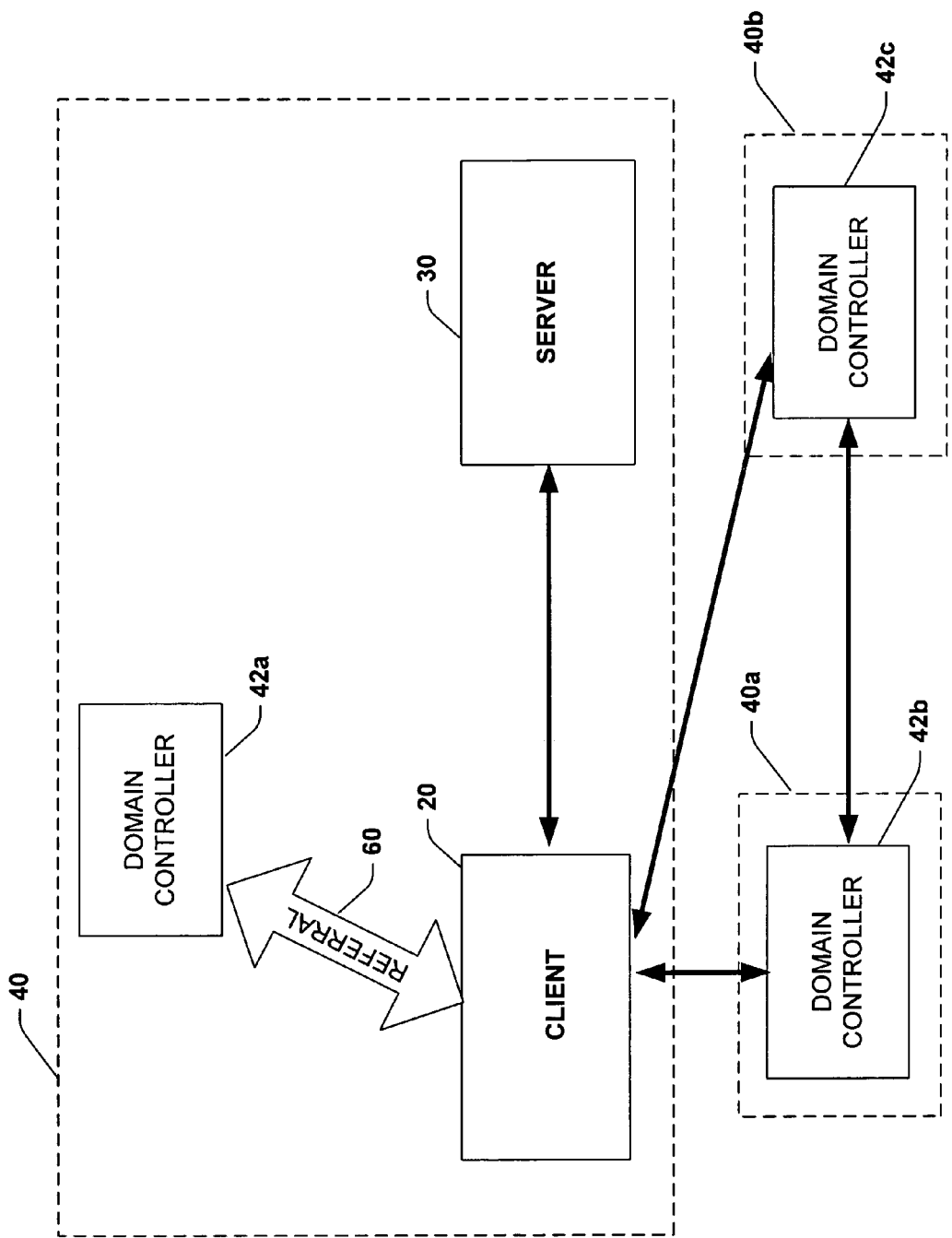
FIG. 2b is a schematic block diagram illustrating a referral service in accordance with one aspect of the present invention.

Turning now to FIG. 2b, a referral service 10c may be provided by the DC 42a for directing the client 20 to another domain. As described above, the client 20 may request for authentication of a particular service within the domain 40. However, the particular service requested by the client 20 may not be available within the domain 40. In accordance with one particular aspect of the present invention, the DC 42a may determine a suitable realm/domain for the requested service by searching accounts within the Directory Service (not shown) and/or Global Service Catalog (not shown) described above and provide a referral 60 to the client 20. The referral 60 may include the SPN of the name of the domain of the client 20 should authenticate to and includes a ticket for the subsequent domain and/or realm. In this manner, management associated with multiple trusted realms is substantially improved over conventional systems.

For example, the SPN provided in the referral 60, may include the name of at least one other domain. By interpreting the referral 60 for the associated domain, the client 20 may then achieve access to a desired domain for that service. Alternatively, the referral may include an intermediate reference to a domain. For example, the client 20 may be referred to DC 42b. However, the requested service may actually be provided by the domain 42c. The DC 42b may then provide a referral to the domain 42c by directing the client to the desired domain via a suitable SPN referencing the DC 42c.

Figure 2C:
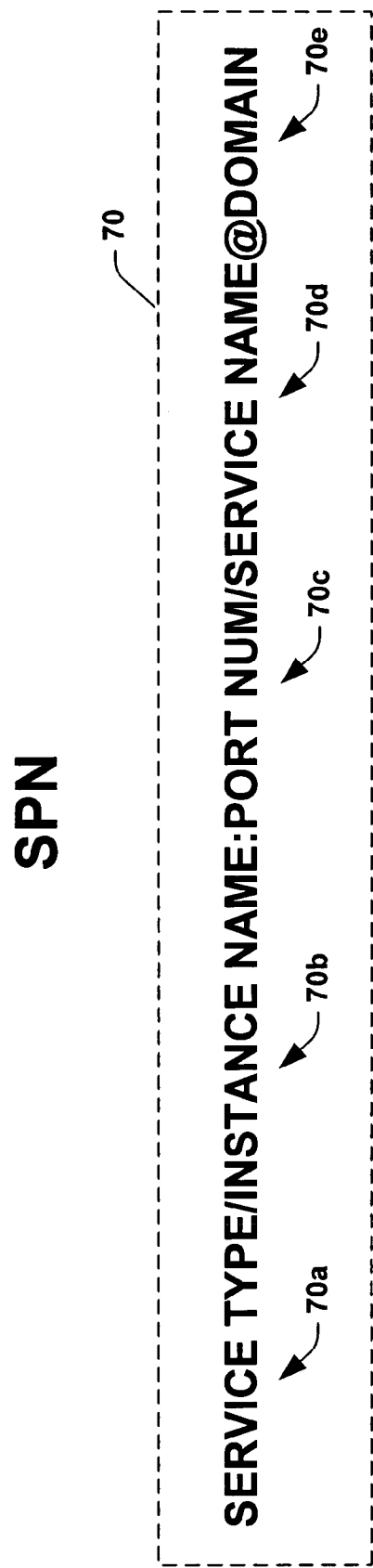
FIG. 2c is a diagram illustrating a Service Principal Name (SPN) syntax in accordance with one aspect of the present invention.

Turning now to FIG. 2c, an exemplary syntax for an SPN 70 is shown in accordance with the present invention. The SPN 70 may include a Service Type field 70a, an Instance Name 70b, a Port Number field 70c, a Service Name 70d and a Domain Name 70e. The Service Type 70a refers to the type or kind of service, for example, "www" for a web service and "ldap" for a directory service. The Instance Name 70b refers to the name of an instance of a service. For example, depending on the Service Type 70a, the Instance name may be a name or IP address of a host running the service. The Port Number 70c may be employed to refer to the port number of the service on a host—if different from the default number for that service type. The Service Name 70d refers to the name of a particular service—if different than the Instance Name 70b. For example, it may be the DNS name of a host, of a replicated service, or of a domain. The Domain 70e is the domain or realm containing a particular services account and may be optionally included.

If the Service Name 70d and Instance Name 70b are the same, for example, as with many host based services, the SPN 70 may be abbreviated as ServiceType/InstanceName: PortNumber. If the Port Number 70c is a default for the Service Type 70a, the SPN 70 may be further abbreviated to ServiceType/InstanceName. If name cannonicalization is employed as described above to resolve the SPN 70, the local directory service may be searched for an account associated with the SPN 70, then if no match is found, the Global Catalog Service (GC) 52 described above may then be searched. The client 20 may optionally specify a domain/realm in order to avoid having to search the GCS 52 for the account with the SPN 70.

Another aspect of the present invention relates to how SPNs may be employed to manage and authenticate replicated services. For example, a user generally wants to be assured that they communicate with an instance of a service name the user provided—even if the service is replicated and the user is not aware of the replication. The Service Name 70d component of the SPN 70 satisfies this requirement since it is independent of whether the service is replicated.

Relating to multiple services on the same machine, an administrator may want to configure a server to run instances of multiple services. If the instances do not totally trust each other, and/or are not similarly trusted by clients, then the instances may have different SPNs with different keys in order that server authentication may assure clients they are communicating with a suitable service. The Service Type 70a portion of the SPN 70 helps ensure that SPNs of different services running on a server are different. For example, a non-replicated POP server and a non-replicated Web server running on a host "srv.example.com", may have the following SPNs, "pop/srv.example.com/srv.example.com" and "web/srv.example.com/srv.example.com", respectively. If the Service Type 70a were not present in the SPN 70, the SPNs would be the same.

Relating to multiple instances of one service on the same machine, an administrator may want to configure a server to run multiple instances of a single service on behalf of different users. If the instances do not trust each other, and/or are not trusted by clients, then the instances may have different SPNs with different keys, in order that server authentication may help ensure clients are communicating to the appropriate service. The instances may also need to be run utilizing ports in order to make connections to a suitable instance at a transport layer. The Port Number 70c may be employed to enable clients to authenticate to the desired instance. For example, a plurality of users or groups may run their own HTTP server on a single machine—each utilizing a different port. Without the Port Number 70c, the SPNs would therefore appear similar.

Another aspect of the present invention is related to enabling users to authenticate services to a host having multiple names. A host having multiple names in a DNS, and users may want to connect to services on the host using those names along with mutual authentication. The desire to provide mutual authentication on additional DNS names implies that SPNs containing the names should be registered. For example, when host names change, SPNs may need to be modified as follows: When a value of an additionalDnsNames attribute is changed from "oldhost" to "newhost", the SPN list may be updated by finding all SPNs of the form "svc/oldhost" and "svc/oldhost/rest . . . " and modifying them to "svc/newhost" and "svc/newhost/rest . . . ".

If a value "newhost" is added to the additionalDnsNames attribute, then for SPNs of the form "svc/host" or "svc/host/rest . . . " wherein host is the value of dnsHostName, a new SPN of the form svc/newhost" and "svc/newhost/rest . . . " may be added. If a value "oldhost" is deleted from the additionalDnsNames attribute, then SPNs of the form "svc/oldhost" or "svc/oldhost/rest . . . " may be deleted.

Modifying the value of the additionalDnsNames attribute may be controlled by an ACL, which enables authorized users (e.g., administrators) to set it. It is noted, that since the values in additionalDnsNames may permit host-base service SPNs to be registered by non-admins it may need to be set by a trusted third party who attests that the DNS host correctly identifies the host. The dnsHostName attribute is generally set once when the computer account is created and when the computer joins the domain.

According to another aspect of the present invention, SPNs may also be modified when the DNS host name is changed. When the DNS name of a host changes, the SPNs for the host may become invalid. Thus, it is desirable to modify the SPNs. This may be achieved as follows: When a dnsHostName attribute is changed from "oldhost" to "newhost", the SPN list should be updated by locating SPNs of the form "svc/oldhost" and "svc/oldhost/rest . . . " and modifying them to "svc/newhost" and "svc/newhost/rest . . .". Modifying the value of the dnsHostName attribute may be controlled by the ACL, which enables "domain admins" to set the attribute. It is noted that since the value of dnsHostName may permit host-base service SPNs to be registered by non-admins it may needs to be set by a trusted third party who attests that the DNS host suitably identifies the host.

In accordance with another aspect of the present invention, SPNs may be employed to provide improved security for the replicated services described above. The improved security helps ensure that unauthorized users are not permitted to improperly access client secrets. Security may be improved by including the name of the replicated service within the SPN 70. For example, as described above, SPNs for a replicated service may be "print/p1.example.com/prt.example.com" and "print/p2.example.com/prt.example.com". If an attacker causes a DNS to return "pwkgrp.example.com" as the server running "prt.example.com", then the client may construct the SPN "print/pwkgrp.example.com/prt.example.com", which will not exist in the DC's 42a database. Therefore, the trusted third party (e.g., Kerberos) will not be able to generate a ticket for the request, hence, the server will not be authenticated, and the attack will fail.

Figure 3:
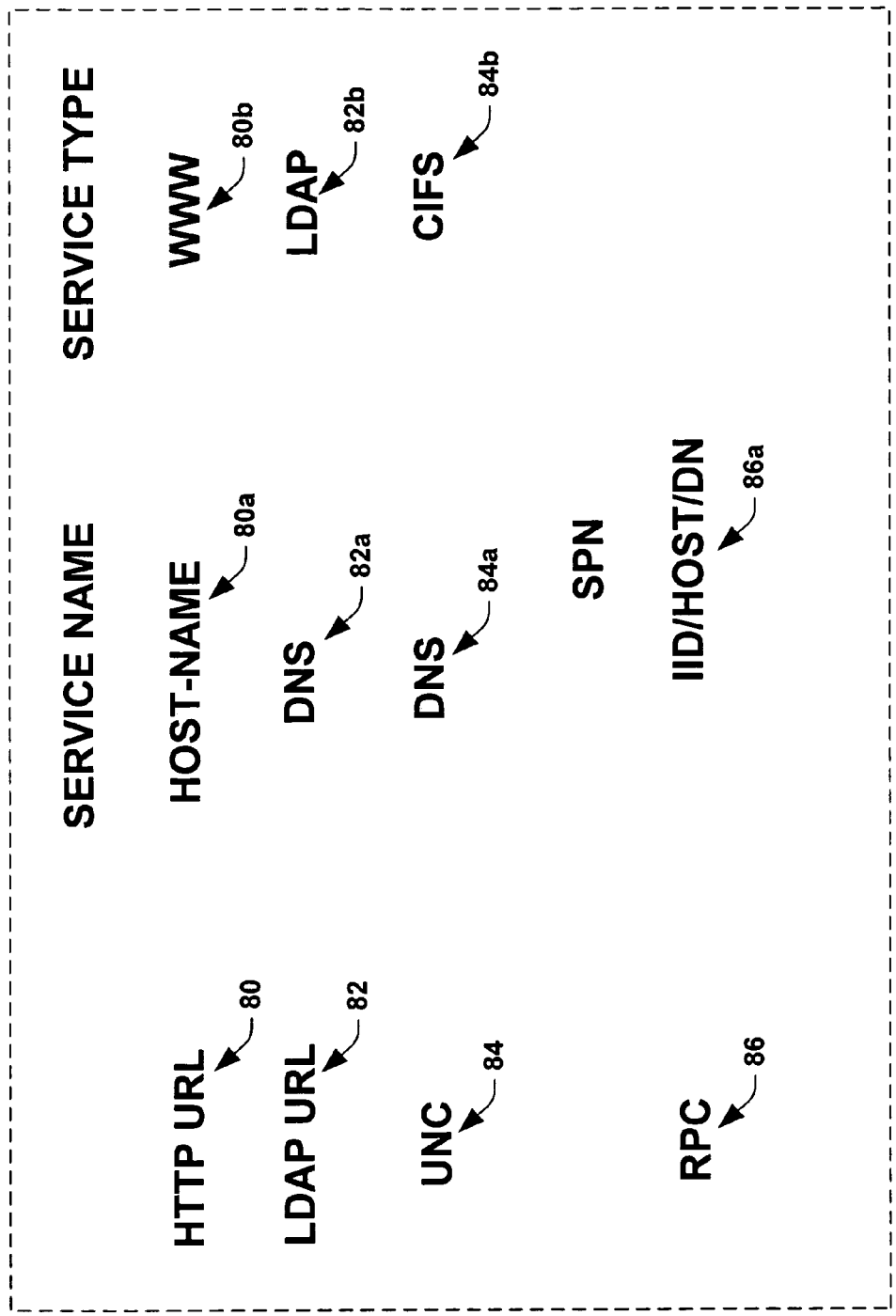
FIG. 3 is a diagram illustrating implicitly derived service principal names in accordance with one aspect of the present invention.

Referring now to FIG. 3, an alternative aspect of the present invention illustrates how an implicit list of commonly referred service names may be defined in order that SPNs may automatically be defined for the domain controller accounts described above. In many cases, users do not supply service names directly but instead supply other forms of names such as HTTP, LDAP URLs and/or UNC names. The description below defines a process wherein service names may be derived for a user supplied name.

If an HTTP URL 80 is supplied from a user having such forms for example as "http://host-name:port/path" or "https://host-name:port/path" then a derived service name may be "host-name" 80a, and the service type may be "www" 80b. For example, if the HTTP URL is "http://www.example.com/foo.html", then the service name may be "www.example.com". If the server's SPN has one or more records associated with it, then the SPN may be "http/www.example.com/www.example.com". Additionally when authenticating to this particular server, the client may request a ticket for the server principal name utilizing the above described SPN. In this manner, a verification is performed ensuring that the server contacted is really the one that contains the requested URL. If the HTTP URL is "http://ipaddr:port/path" and returned in an HTTP redirect from a server whose SPN was "www/host/domain", then the service name may be "ipaddr" and the service type may be "www".

If an LDAP URL 82 were supplied, such as "ldap://dns:port/DN", then a suitable service name of the LDAP server to resolve the domain name (DN) may be "dns" 82a and the service type may be "ldap" 82b. If a supplied LDAP URL were "ldap://dns:port/DN" and the URL refers to the name of a service connection point object (e.g., a print spool service), then the service name would be "DN" and the service type may be, for example, "print".

If a UNC name 84 were provided with the name "\\dfs\path", then the service name may be "dns" 84a and the service type may be "cifs" 84b for example. In a similar manner, if an RPC service 86 were involved, with a given host interface id "iid", which had a related domain name "dn" and was in a domain "dom", running on a server "host", the SPN may be "iid/host/dn". It is noted that other derived names may also be determined in a similar manner for other such services such as NNTP, POP, FTP and Telnet to name but a few examples.

Another feature of providing implicit names that are derived from requested services are that administrative changes may be achieved in a fast and economical manner. For example, if the SPNs described above were administratively entered for each SPN in each account, and if a named service were to change, a single implicit name as described above may readily be changed without affecting changes for the entire list of names in the account—thus saving considerable time and effort. It is noted that explicit SPNs may be set up in a separate services account, for example, which may override the implicitly derived names described above.

Figure 4:
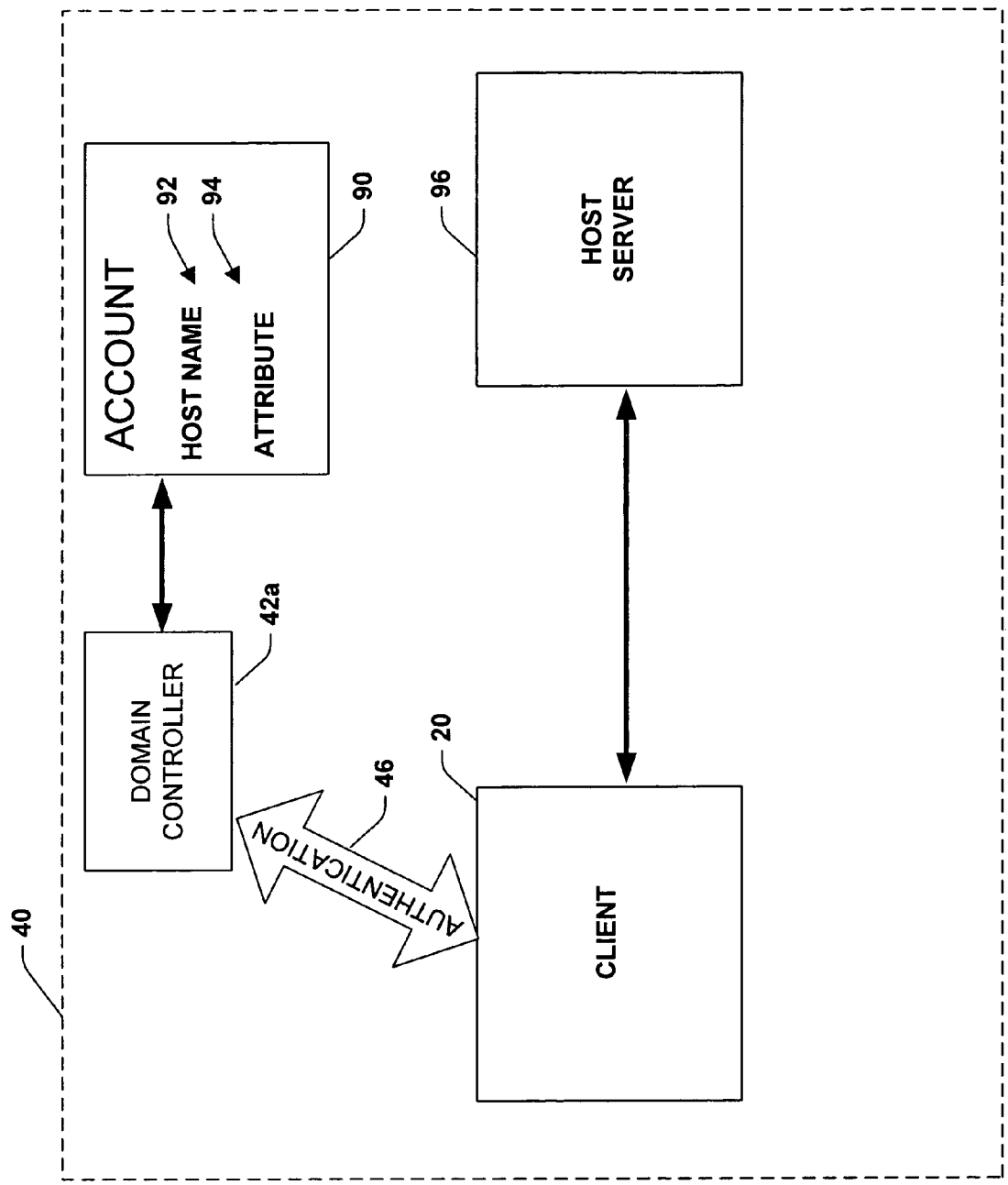
FIG. 4 is a schematic block diagram depicting a constraint checking system in accordance with one aspect of the present invention.

Turning now to FIG. 4, an alternative aspect of the present invention illustrates a system for constraint checking in order to increase security when authenticating to a particular server. Constraint checking prevents unauthorized servers from authenticating to unsuspecting clients by verifying an instance name attribute with a DNS host name. The associated attributes may be stored for example in the domain controller accounts described above. For example, if a user were not a domain administrator, they may not be able to create a domain service or a service account, however, the user may be able to improperly set up a server that the client may log into and/or start services on. This may be achieved, for example, by utilizing a user's account with an associated SPN as an alternate identity. In order to prevent unwanted servers from stealing client secrets, constraint checking may be employed as described below.

In general, the SPN for a service may not be set by the service itself—a principal of mutual authentication is that some independent third party 42a, trusted by both the client 20 and the server 96, attests that the SPN correctly identifies the service. If adhered to rigidly, this rule may imply that services would have to be installed by a "domain administrator". However, for services that are "host-based", it is possible to tell whether the SPN being registered by a service is correct (e.g., a host-based service is one such as telnet or FTP, or a non-replicated web server). An exemplary SPN of a host-based service may appear like "service-class/dns-host-name". Substantially any service may be enabled to add an SPN of this form to an account object if the "dns-host-name" 92 matches the value of the dnsHostName attribute 94 for that account.

For example, if the servicePrincipalName is set by LDAP write, and a caller has "write" permission, it may be of substantially any form. By default, this may enable only "domain administrators" to set arbitrary SPNs for an account. More precisely, writes may be enabled by those who are the "trusted third parties" who vouch for the identity of services. In addition, certain forms may be permitted even if writes are not allowed by an ACL, but if the caller has a "special-write" permission, then writes of the form "svc/host" may be allowed, if host is the value of the dnsHostName attribute 94 on the same account object or the value of a samAccountName attribute (not shown—on the same account object) minus a '$'.

Figure 5:
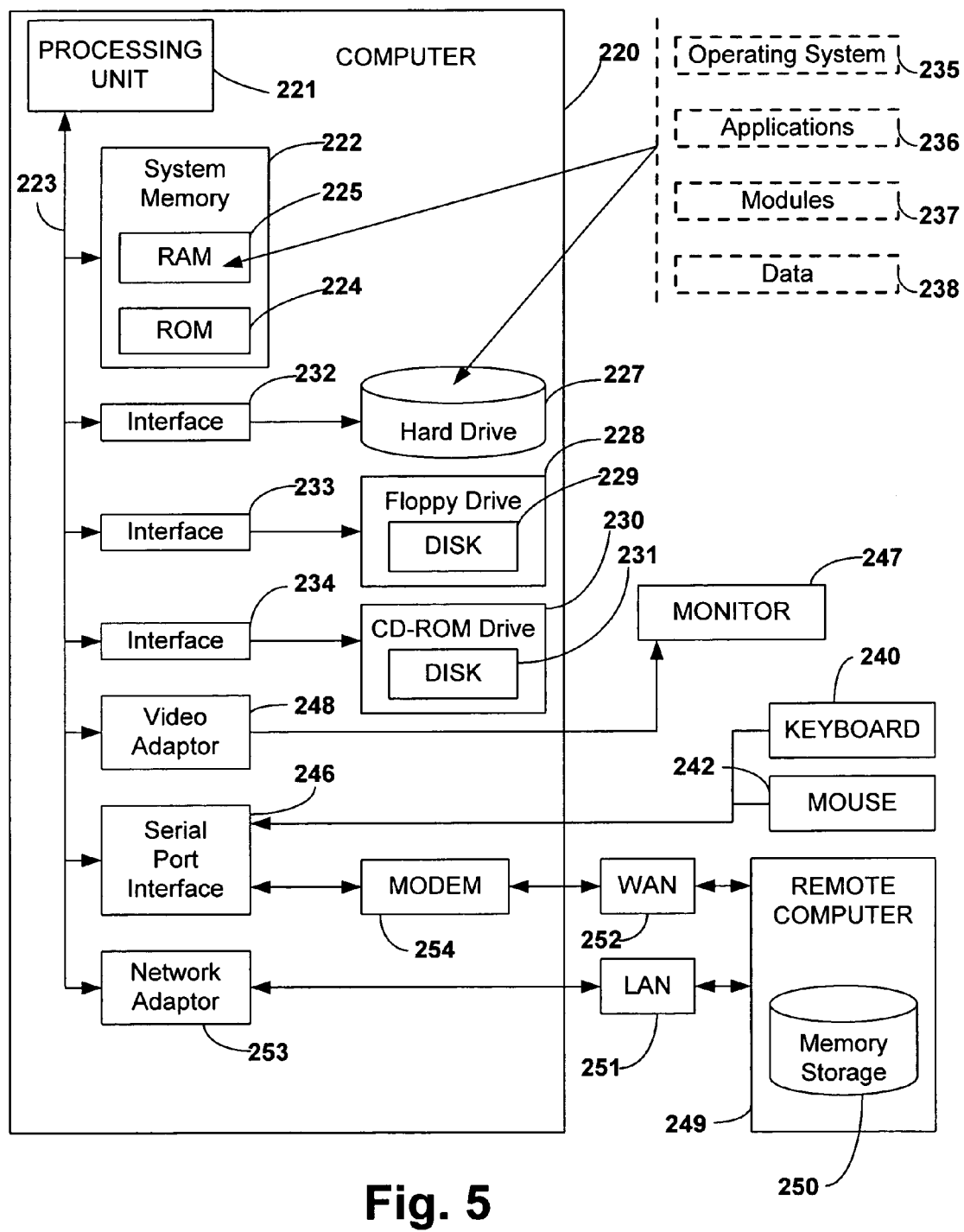
FIG. 5 is a schematic block diagram illustrating a system in accordance with one aspect of the present invention.

In order to provide a context for the various aspects of the invention, FIG. 5 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 5, an exemplary system for implementing the various aspects of the invention includes a conventional server computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The server computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer is the Microsoft Windows NT Server operating system, together with the before mentioned Microsoft Transaction Server.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The server computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 5. The logical connections depicted in FIG. 5 include a local area network (LAN) 251 and a wide area network (WAN) 252. Such networking environments are commonplace in offices, enterprise-wide computer networks, intranets and the Internet.

When used in a LAN networking environment, the server computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the server computer 220, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where such data bits are maintained are physical locations that have particular electrical, magnetic, or optical properties corresponding to the data bits.

Figure 6:
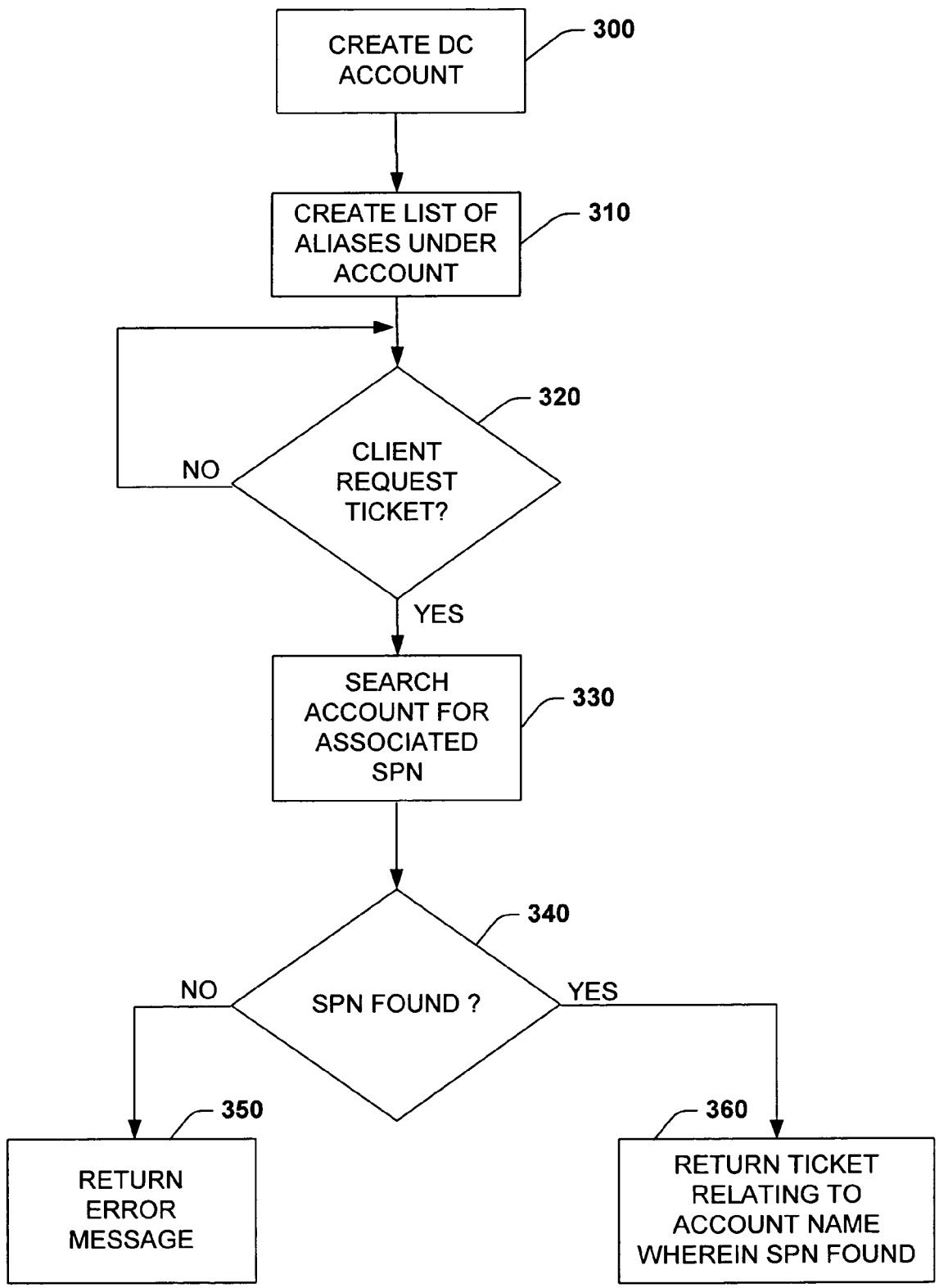
FIG. 6 is a flow chart diagram illustrating a methodology for authenticating a server in accordance with one aspect of the present invention.

Referring now to FIG. 6, a methodology illustrates a particular aspect of the present invention for authenticating services via SPNs and name cannonicalization. At step 300, a domain controller account is created that is associated with a particular server. For example, the domain controller account may have a name closely associated with the particular server host name. At step 310, Service Principal Names SPNs (e.g., aliases) are created in the account for particular services and/or host names associated with a particular server. As described above, the SPNs may be implicitly derived from commonly referred to host services names and/or may be administratively entered or download into the domain controller account.

At step 32, the domain controller checks if a request for authentication of services has been received from a client. If no request has been made at step 320, the process proceeds back to step 320. If a request has been made, the process proceeds to step 330. At step 330, the domain controller searches the account created above for a matching SPN with the client request. If an SPN match is not found at step 340, the process proceeds to step 350 and may return an error message to the client. If an SPN match is found at step 340, the process proceeds to step 360.

At step 360, the process returns a ticket relating to the account name wherein the SPN match was found at step 340—the client may now proceed to access the server. By returning a ticket that is authenticated to the account under which the SPN was found, name cannonicalization has been performed at the domain controller and thus clients administrative and management burdens have been mitigated.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method, using a domain controller, for facilitating authentication of a service, comprising the steps of:
    making a request to a first party for authentication of the service, the request including a first alias;
    searching a list of aliases associated with the service;
    enabling a second party making the request to access the service if a match is found between the first alias and at least one alias of the list of aliases.

2. The method of claim 1 wherein the first party is a domain controller.

3. The method of claim 2 wherein the domain controller includes a directory service and a Global Catalog Service.

4. The method of claim 1 wherein the authentication of the service is provided via Kerberos.

5. The method of claim 1 wherein the aliases are Service Principal Names.

6. The method of claim 5 wherein the Service Principal Names further comprise at least one of a Service Type, an Instance Name, a Port Number, a Service Name and a Domain.

7. The method of claim 5 wherein the Service Principal Names are associated with an account related to a server.

8. The method of claim 7 wherein the step of searching a list of aliases further comprises the steps of:
    searching the account for an associated Service Principal name; and
    providing name cannonicalization by returning a ticket related to the account.

9. A system for facilitating a client authenticating a server, comprising:
    a domain controller operatively coupled to the client and server, the domain controller providing a plurality of aliases which permit the client to authenticate the server via at least one of the aliases.

10. A system, having a domain controller, for facilitating authentication of a service, comprising:
    means for receiving a request for authentication of the service from a client, the request including a first alias;
    means for searching a list of aliases associated with the service;
    means for enabling the client to access the service if a match is found between the first alias and at least one alias of the list of aliases.

11. The system of claim 10 further including a means for generating an implicit list facilitating automatic creation of Service Principal Names.

12. The system of claim 11 further including a means for constraint checking in order to prevent authentication to an unauthorized server.

13. The system of claim 12 wherein the means for constraint checking includes a Host Name and an attribute.

14. The system of claim 13 wherein the means for constraint checking includes having a means for determining if a server is authentic by matching the Host Name with the attribute.

15. A system for facilitating authentication of a service, comprising:
    a domain controller for receiving a request for authentication of the service from a client, the request including a first alias;
    wherein the domain controller searches a list of aliases in an account associated with the service;
    wherein the domain controller enables the client to access the service via a ticket if a match is found in the account between the first alias and at least one alias of the list of aliases.

16. The system of claim 15 wherein the aliases are Service Principal Names.

17. The system of claim 16 wherein the Service Principal Names further comprise at least one of a Service Type, an Instance Name, a Port Number, a Service Name and a Domain.

18. The system of claim 15 further including an implicit list to facilitate automatic creation of Service Principal Names.

19. The system of claim 18 further including constraint checking in order to prevent authentication to an unauthorized server.

20. The system of claim 19 wherein the constraint checking includes a Host Name and an attribute.

21. The system of claim 20 wherein the constraint checking includes determining if a server is authentic by matching the Host Name with the attribute.

22. The system of claim 15 further including a referral service for directing the client to another domain.

23. The system of claim 22 wherein the domain the client is directed to may refer the client to another domain.

24. The system of claim 15 wherein improved security is provided for replicated services by including the name of the replicated service within a Service Principal Name.

* * * * *